United States Patent
Chen (10) Patent No.: US 10,530,589 B2
(45) Date of Patent: Jan. 7, 2020

(54) METHOD, APPARATUS AND SYSTEM FOR SECURITY APPLICATION FOR INTEGRATED CIRCUIT DEVICES

(71) Applicant: GLOBALFOUNDRIES INC., Grand Cayman (KY)

(72) Inventor: An Chen, Sunnyvale, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 142 days.

(21) Appl. No.: 15/653,497

(22) Filed: Jul. 18, 2017

(65) Prior Publication Data

US 2017/0324569 A1 Nov. 9, 2017

Related U.S. Application Data

(63) Continuation of application No. 14/680,961, filed on Apr. 7, 2015, now Pat. No. 9,755,841.

(51) Int. Cl.
| | |
|---|---|
| *G06F 21/60* | (2013.01) |
| *H04L 9/32* | (2006.01) |
| *G06F 12/14* | (2006.01) |
| *H04L 9/08* | (2006.01) |

(52) U.S. Cl.
CPC ........ *H04L 9/3278* (2013.01); *G06F 12/1408* (2013.01); *H04L 9/0866* (2013.01); *G06F 2212/1052* (2013.01)

(58) Field of Classification Search
CPC ..... H04L 9/3278; G06F 12/14; G06F 2212/10
See application file for complete search history.

(56) References Cited

U.S. PATENT DOCUMENTS

| | | | |
|---|---|---|---|
| 2013/0142329 A1 | 6/2013 | Bell et al. | |
| 2014/0140513 A1 | 5/2014 | BrightSky et al. | |
| 2015/0071432 A1* | 3/2015 | Zhu | G11C 11/1673 380/28 |
| 2016/0093393 A1* | 3/2016 | Park | G11C 16/26 380/28 |

OTHER PUBLICATIONS

Office Action dated Jul. 22, 2016 from co-pending U.S. Appl. No. 14/680,961 now U.S. Pat. No. 9,755,841.
Final Office Action dated Nov. 4, 2016 from co-pending U.S. Appl. No. 14/680,961 now U.S. Pat. No. 9,755,841.

* cited by examiner

*Primary Examiner* — Wasika Nipa
(74) *Attorney, Agent, or Firm* — Williams Morgan, P.C.

(57) ABSTRACT

At least one method, apparatus and system disclosed involves providing a restricted access protocol for accessing a memory device. A first memory portion of a memory device is selected for providing an access confirmation. At least one of setting or resetting of memory cells of the first memory portion is performed. A first voltage is provided for switching the memory cells. The first voltage is associated with a predetermined switching probability. A first input signal comprising at least one address associated with the memory cells is provided. A first responsive signal is received in response to the input signal. The first responsive signal comprises data relating to the state of the memory cells. An access key is provided for the access confirmation based upon a relationship between the first input signal and the first responsive signals for providing an access key.

19 Claims, 10 Drawing Sheets

METHOD, APPARATUS AND SYSTEM FOR SECURITY APPLICATION FOR INTEGRATED CIRCUIT DEVICES

FIELD OF THE INVENTION

Generally, the present disclosure relates to the manufacture of sophisticated semiconductor devices, and, more specifically, to various methods and structures for a novel security application for integrated circuit devices, such as non-volatile memory devices.

DESCRIPTION OF THE RELATED ART

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as exposure tool or a stepper. As an example, an etch process may be performed on the semiconductor wafers to shape objects on the semiconductor wafer, such as polysilicon lines, each of which may function as a gate electrode for a transistor. As another example, a plurality of metal lines, e.g., aluminum or copper, may be formed that serve as conductive lines that connect one conductive region on the semiconductor wafer to another. Since various processing steps are performed in manufacturing integrated circuits, manufacturing variations may cause slight differences (e.g., biasing relating to bit state) from one device to another.

Using the various manufacturing steps described above, integrated circuit chips, such as non-volatile memory devices, may be fabricated. In some cases, these non-volatile memory devices are manufactured with dedicated hardware security features. Security is a major concern since non-volatile memory device may hold data that is to be protected and/or restricted.

One implementation of security with regard to non-volatile memory is the implementation of physical unclonable functions (PUFs). PUFs are defined as functions based on physical characteristics that are unique to each device. These characteristic are generally difficult to predict, are easy to evaluate, and are generally reliable. These functions should also be distinctive to each device and difficult to duplicate. PUFs can serve as a root of trust and can provide a key which cannot be easily reverse engineered. PUFs work on the principle that every circuit has slight idiosyncrasies, based on process and other variations that would make a device unique.

Within a memory device, upon power up, each bit can enter a high or low state. Slight manufacturing variations will bias each bit slightly differently from the corresponding bit in another memory device that has the same design. Therefore, these differences in the power up states of corresponding bits across several devices provide a unique signature for each device. This unique signature can be used as a key for security purposes. Since each chip will have a different key, there is far less value in trying to guess keys. Even if a key is correctly guessed, that key will work only for the one chip.

Figure 1:
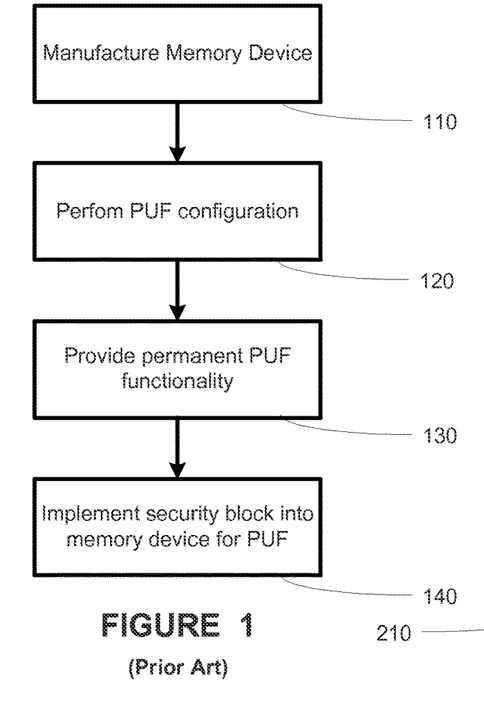
FIG. 1 illustrates a flowchart depiction of a typical method for providing a PUF functionality.

Turning now to FIG. 1, a flowchart depiction of a typical method for providing a PUF functionality is illustrated. Manufacturers may fabricate a non-volatile memory device (block 110). A PUF configuration is performed in order to take advantage of the peculiarity of a particular device for restricting access to the device (block 120). Manufacturers generally fabricate dedicated security blocks that are capable of implementing PUFs. A permanent PUF implementation is then performed (block 130). A more detailed description of the step of implementing a permanent PUF is provided in FIG. 2 and accompanying descriptions below. Once a permanent PUF capability is implemented, a permanent security block is implemented into the device for the PUF (block 140).

Figure 2:
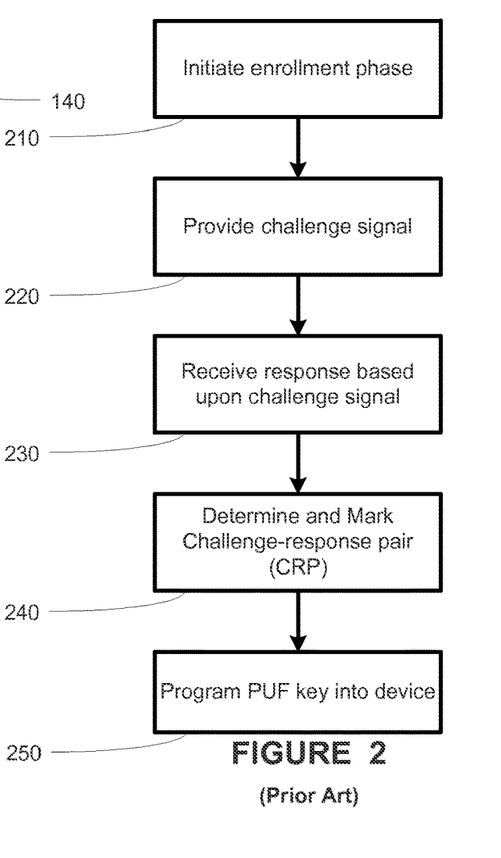
FIG. 2 a flowchart depiction of a typical method for providing a permanent PUF implementation.

FIG. 2 illustrates a flowchart depiction of a typical method for providing a permanent PUF implementation is illustrated. An enrollment phase may be initiated (block 210). This may include providing a challenge signal to the memory device (block 220). The challenge signal may include data indicative of a peculiar feature of the memory device to the security block of the memory device. Based upon the challenge signal, a response signal is received (block 230). The response signal includes data responsive to the challenge signal that may be indicative of features of the security block.

Based upon the response signal, one or more challenge-response pairs (CRPs) are determined and marked (block 240). The CRP values may then later be compared to security challenges to confirm security approval. Based upon the CRP values, a PUF key is derived (block 250). The PUF key is programmed into the memory device.

One of the problems with state of the art PUF implementations includes the fact that the CRP values are non-reconfigurable or permanent. That is, the relationship between the challenge and the expected response value is permanently set during the PUF implementation. The CRP values are used to generate a PUF key, wherein the PUF key is programmed into the device for future security implementations. This PUF key implementations are permanent in the security block, and are non-reconfigurable.

Another problem with the state of the art PUF implementations generally include the fact that the state of the art requires dedicated security blocks. This adds costs for manufacturing the devices, as well as a compromise in performance of the device. Many times, the security blocks of state of the art PUF implementations are relatively large, thereby consuming resources and restricting operations of the memory device.

Moreover, state of the art PUF implementations rely on manufacturing variability. State of the art PUF implementations require sufficient manufacturing variability to cause biasing of some bits in a different manner as compared to corresponding bits on another device. If sufficient manufacturing variability is not present, the PUF implementation may be compromised. Moreover, the effects of manufacturing variability may change over time. Since the state of the art PUF implementations rely on manufacturing variability, the effectiveness of PUF depends on manufacturing process.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for providing a restricted access protocol for accessing a memory device. A first memory portion of a memory device is selected for providing an access confirmation. At least one of setting or resetting of memory cells of the first memory portion is performed. A first voltage is provided for switching the memory cells. The first voltage is associated with a predetermined switching probability. A first input signal comprising at least one address associated with the memory cells is provided. A first responsive signal is received in response to the input signal. The first responsive signal comprises data relating to the state of the memory cells. An access key is provided for the access confirmation based upon a relationship between the first input signal and the first responsive signals for providing an access key.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for utilizing one or more intrinsic variability in memory portions of integrated circuit devices for providing a security function. For example, the memory mechanism of a memory device for providing a security function for accessing the memory device. For example, the "on" state or the "off" state of memory portions of a memory device may be used to perform an authentication process for providing access to the memory device. In many non-volatile memory (NVM) devices (e.g., RRAM, STTRAM, etc.), memory cells switch "on" or "off" with a certain probability that is related to applied voltage. That is, the probability of a memory cell of a NVM memory device switching to "0" (low or off) state or to "1" (high or on) state is voltage-dependent. In many embodiments, a particular voltage may correspond to an on-state or off-state with a 50% substantially random probability. Embodiments herein may be capable of utilizing this random probability to implement a secure access protocol, such as physical unclonable functions (PUFs).

Embodiments herein provide for using a PUF implementation to provide a challenge input and generate a response output that is responsive to the challenge input. The challenge input and the response output may be paired to create a challenge-response pair (CRP). Therefore, the CRP effectively converts the physical randomness of the memory device into digital bit streams that comprise the randomness. In embodiments herein, an address of a memory cell may serve as the challenge for a PUF implementation. The response to the challenge may be the state of the cell (e.g., "1" for on-state and "0 for off-state) corresponding to that address. The CRP comprises the randomness induced by the NVM probabilistic switching based upon the applied voltage.

Further, embodiments herein provide for changing the CRPs, which results in the PUF implementations of embodiments herein being reconfigurable. One or more memory cells in the NVM device may be further cycled (i.e., the memory cells being set and reset) in order to provide a new set of CRPs. Based upon this cycling, the PUF is effectively reconfigured with a new random distribution of on and off states. Moreover, implementation of the PUFs described herein may be utilized in standard memory arrays without requiring additional hardware. Even though various embodiments herein are described in the context of memory devices, those skilled in the art having benefit of the present disclosure would appreciate that the concepts disclosed herein may be implemented into various types of integrated circuit devices that have memory portions.

Figure 3:
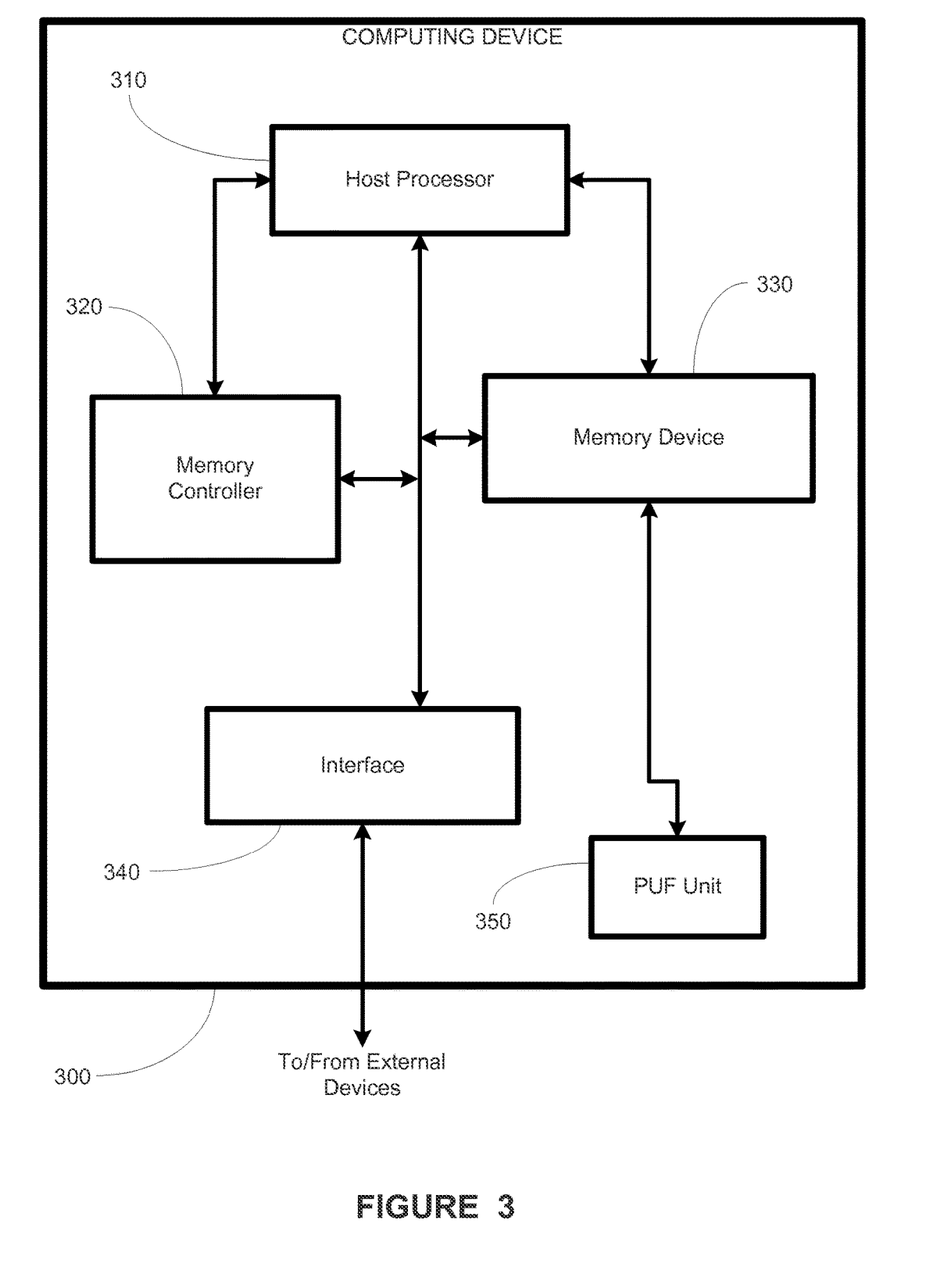
FIG. 3 illustrates a stylized block diagram depiction of a computing device 300, in accordance with embodiments herein.

Turning now to FIG. 3, a block diagram depiction of a computing device system 300, in accordance with embodiments herein, is illustrated. The computing device system 300 may be a computer system, a laptop, a tablet computer, a mobile phone, a smart watch, etc. The system 300 comprises a host processor 310, a memory device 330, a memory controller 320, an interface 340, and a PUF unit 350.

The host processor 310 is capable of controlling the functionality of the system 300. The memory device 330 may store various data and/or program code for use by the host processor 310. The memory controller 320 may control the accessing of the memory device 330. The interface provides the ability for communicating with the system 300.

In various embodiments, a PUF consistent with embodiments herein may be implemented into memory portions (e.g., memory device 330) of various types of integrated circuit devices. For example, the memory device 330 may be a non-volatile memory in which a PUF may be implemented. Access to data stored in the memory device 330 may be provided by an authentication process relating to the PUF. A PUF unit 350 in the system 300 is capable of implementing a PUF protocol for the memory device 330.

The PUF unit 350, which may be implemented into various types of integrated circuit devices, is capable of setting up a CRP by providing a challenge stimuli (e.g., memory address), and receiving a response to the challenge (i.e., state of the memory location corresponding to the address). The PUF unit 350 may then mark the response and correlate the CRP, effectively providing an access key. This CRP then may be used to perform authentication for providing secure access to the memory device 330. In some embodiments, data received from sources external to the system 300 may be used to perform an PUF authentication for providing access to the IC device having a memory portion (e.g., the computing device 300 having a memory device 330). Access to the memory device 330 may include reading from, and/or writing to, one or more memory locations (e.g., memory cell) in the memory device 330.

Further, in some embodiments, the PUF unit 350 may also be capable of changing the CRPs, which provide for reconfiguring the PUF implementation. The PUF unit 350 is capable for prompting a further cycling of one or more portions of the memory device 330. This cycling (e.g., setting and resetting) of one or more portions of the memory device 330, followed by a challenge-response signal pairing, provide a new set of CRP(s), thereby reconfiguring the PUF.

Figure 4:
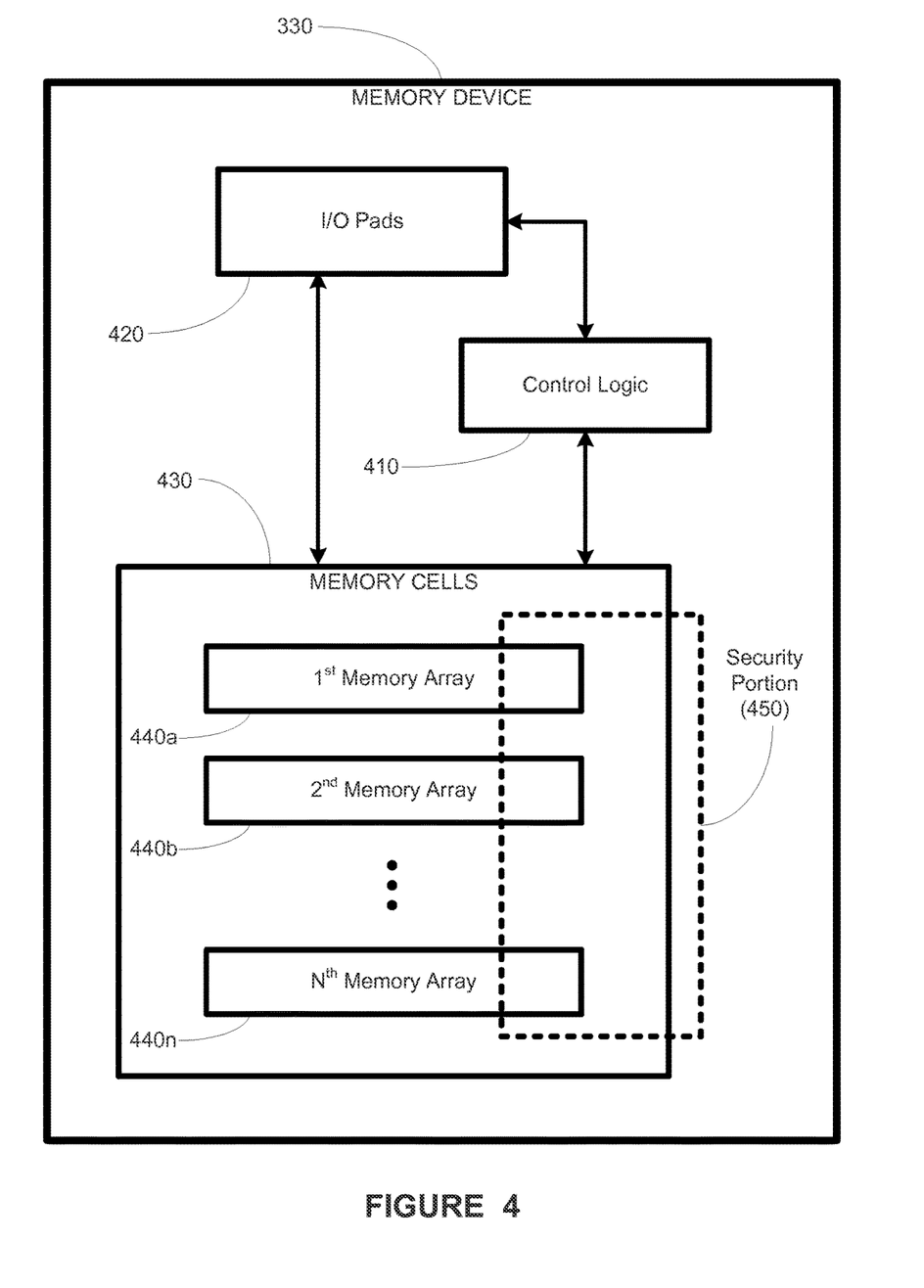
FIG. 4 illustrates a stylized block diagram depiction of a memory device of FIG. 3, accordance with embodiments herein.

Turning now to FIG. 4, a stylized block diagram depiction of the memory device of FIG. 3, in accordance with embodiments herein, is illustrated. The memory device 330 may comprise a plurality of I/O pads 420 and provide access to and from the memory device 330. The memory device 330 also comprises a memory cells 430 portion, which may comprise a first memory array 440a, a second memory array 440b, through an $N^{th}$ memory array 440n.

A control logic 410 in the memory device 330 controls access to the memory cells 430. The control logic 410 is responsive to signals received via the I/O pads 420. The memory cells 430 may also comprise a section for providing the PUF implementation (i.e., security portion 450). In one embodiment, the CRP verification for performing the PUF may be performed on any of the first through Nth memory array 440. In another embodiment, the CRP verification may be restricted to a portion 450 of one or more memory arrays (i.e., the security portion 450). The configuration and/or re-configuration of the PUF implementation may be performed by the PUF unit 350. The configuration and/or re-configuration may comprise selecting a predetermined voltage for switching one or portions of the memory device 330 based upon a predetermined probability (e.g., 50%) of the portions switching to a high or to a low state.

Figure 5:
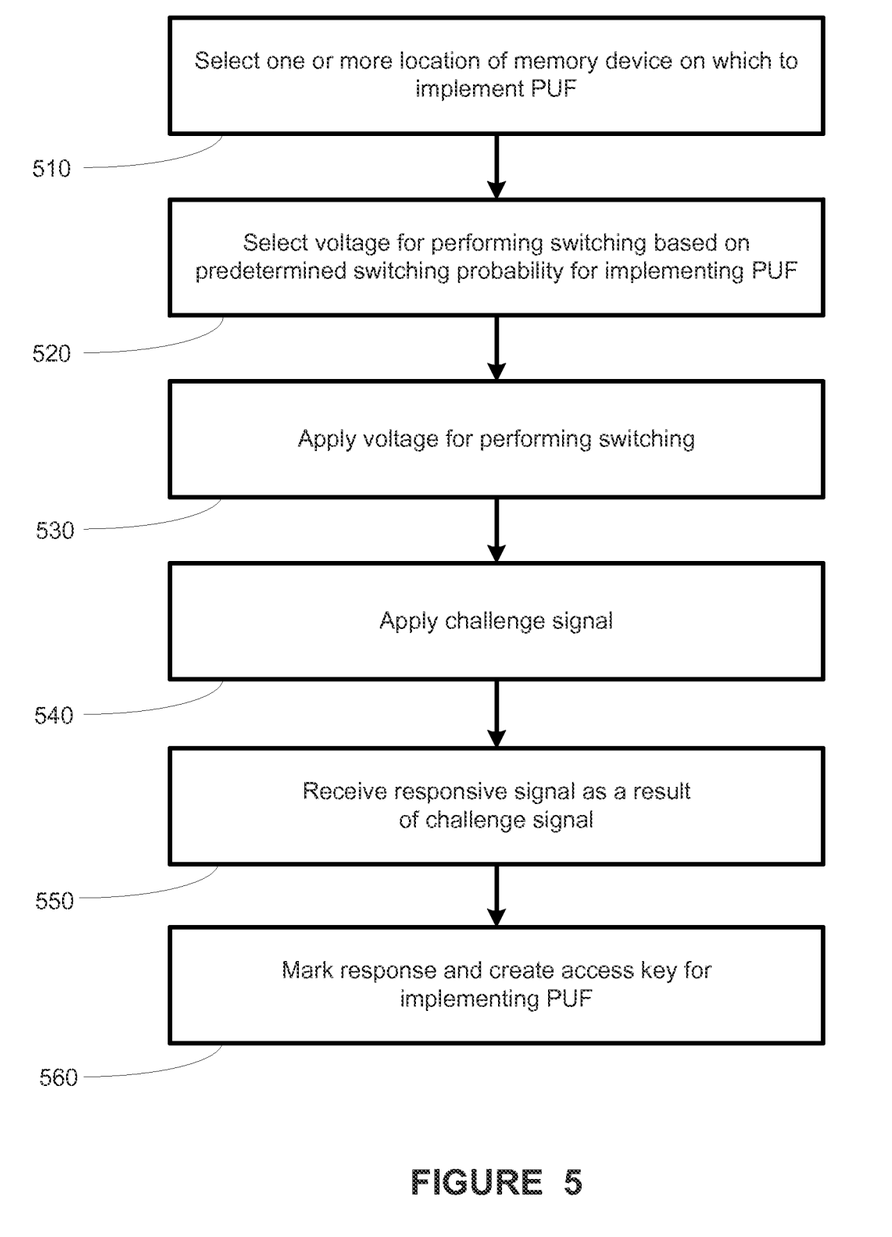
FIG. 5 illustrates a flowchart depiction of providing a PUF implementation for a memory device, in accordance with embodiments herein.

Turning now to FIG. 5, a flowchart depiction of providing a PUF implementation for a an integrated circuit device having a memory portion, in accordance with embodiments herein, is illustrated. In order to provide a security/authentication protocol for accessing a an integrated circuit device, such as a memory device, one or more locations of the memory device may be selected for implementing a PUF (block 510). As exemplified in FIG. 4, a portion of the memory cells 430 may be selected for implementing a PUF. In an alternative embodiment, all of the memory cells 430 in a memory device may be selected for implementing a PUF.

Continuing referring to FIG. 5, once a memory portion of the memory device is selected for implementing a PUF, a switching voltage for performing switching of the memory portion is selected (block 520). The switching voltage is based upon a predetermined switching probability that the memory cells in the memory portion will switch to an on-state or to an off-state. That is, based upon a particular applied voltage, a corresponding switching probability may be characterized, wherein the switching probability refers to the random probability that a particular memory cell will switch from an on-state to an off-state, or vice versa.

Figure 6:
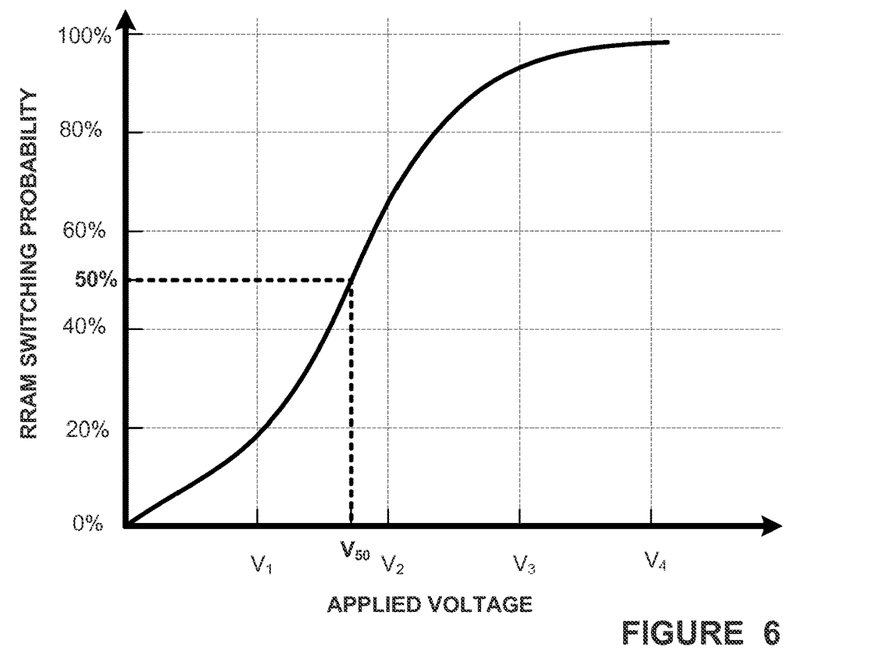
FIG. 6 illustrates a stylized diagram of a switching probability curve for an RRAM device.
Figure 7:
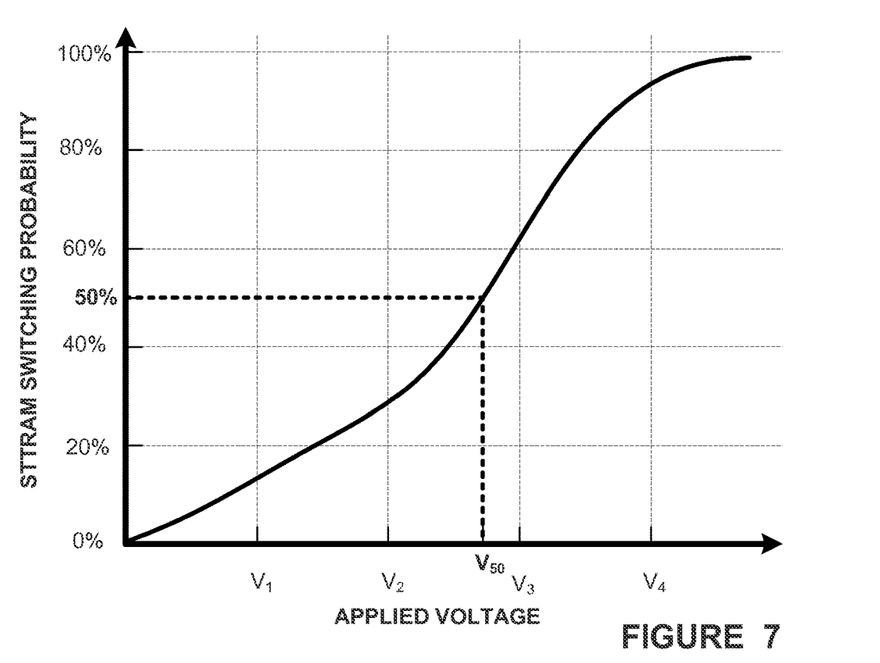
FIG. 7 illustrates a stylized diagram of a switching probability curve for an spin-transfer torque RAM (STTRAM) device.

Referring simultaneously to FIGS. 6 and 7, FIG. 6 illustrates a stylized diagram of a switching probability curve for an RRAM device and FIG. 7 illustrates a stylized diagram of a switching probability curve for an spin-transfer torque RAM (STTRAM) device. Based upon an applied voltage, the probability of switching of non-volatile memory portions (e.g., cells) is dependent to the applied switching voltage.

As shown in Figures, 6 and 7, as the voltage rises, the probability of switching from on-state to off-state, or vice versa, increases. Within the exemplary context of FIGS. 6 and 7, the increase in probability may be non-linear from about 0% to about 20%, substantially linear from about 20% to about 70%, and non-linear from about 70% onwards. At the voltage level $V_{50}$, the probability of switching of the memory portions is 50%. This voltage level may be applied to cause a randomized switching of about half of the memory portions to either the on-state or to the off-state. This switching may be used to implement a PUF. Those skilled in the art having benefit of the present disclosure would appreciate that similar probability relationships may be provided for other types of non-volatile memory devices for providing the PUF implementation described herein.

Continuing referring to FIG. 5, a predetermined switching voltage for performing a switching function for switching the selected portion of the memory device is applied (block 530). The predetermined voltage level may be selected based upon the desired switching probability. In one embodiment, the switching voltage may be of a level to prompt a randomized switching probability of about 50%. The switching probability value may be selected based upon the degree of protection required. For example, a first switching voltage may correspond to a first switching probability and a first security level, while a second switching voltage may correspond to a second switching probability and a second security level.

Upon application of the switching voltage, a challenge signal is formed and applied (block 540). The challenge signal may comprise one or more memory addresses in the predetermined memory portion that is to be used to implement the PUF.

Based upon the challenge signal, a response signal from the memory device may be received (block 550). The response signal may comprise the state of memory locations corresponding to the memory addresses in the challenge signals. The response signals provide randomized results (i.e., on-state or off-state of memory locations) of the application of the switching voltage. The results are substantially random since characteristics of the memory device are generally unique to each memory device. That is, the same switching voltage that is applied to one memory device will generally net a different result when used in another memory device.

Upon receiving the response signals, the on-state/off-state results of particular memory locations may be marked and mapped to the challenge signal (block 560). Using this mapping, an authentication or access key may be formed for authenticating access to the contents of the memory device. The authentication or access key may subsequently be used by various external entities to determine whether to provide access to the contents of the memory device. The authentication or access key described herein may be implemented into various types of integrated circuit devices having a memory portion.

Figure 8:
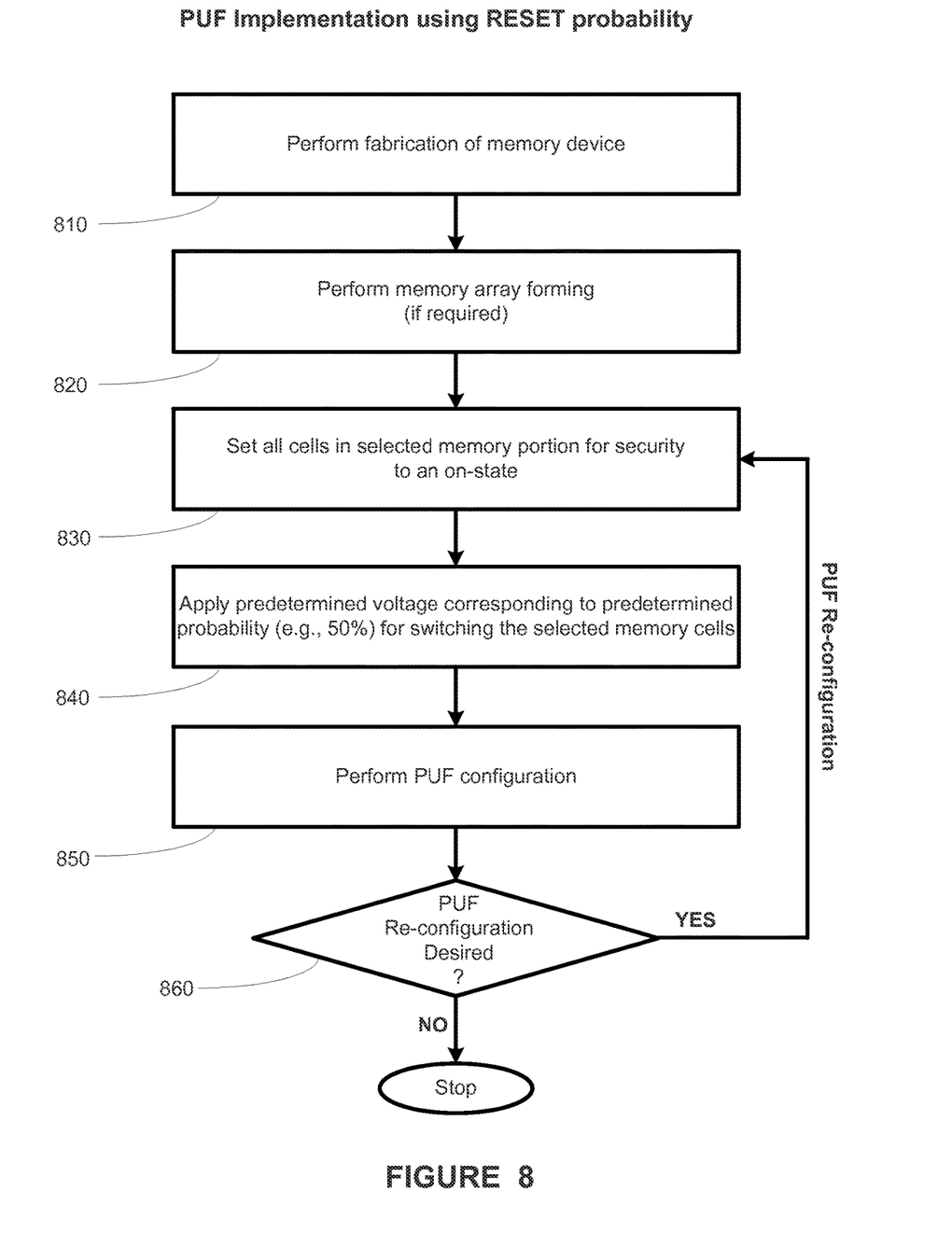
FIG. 8 illustrates a flowchart depiction of a PUF implementation using reset probability, in accordance with embodiments herein.
Figure 9:
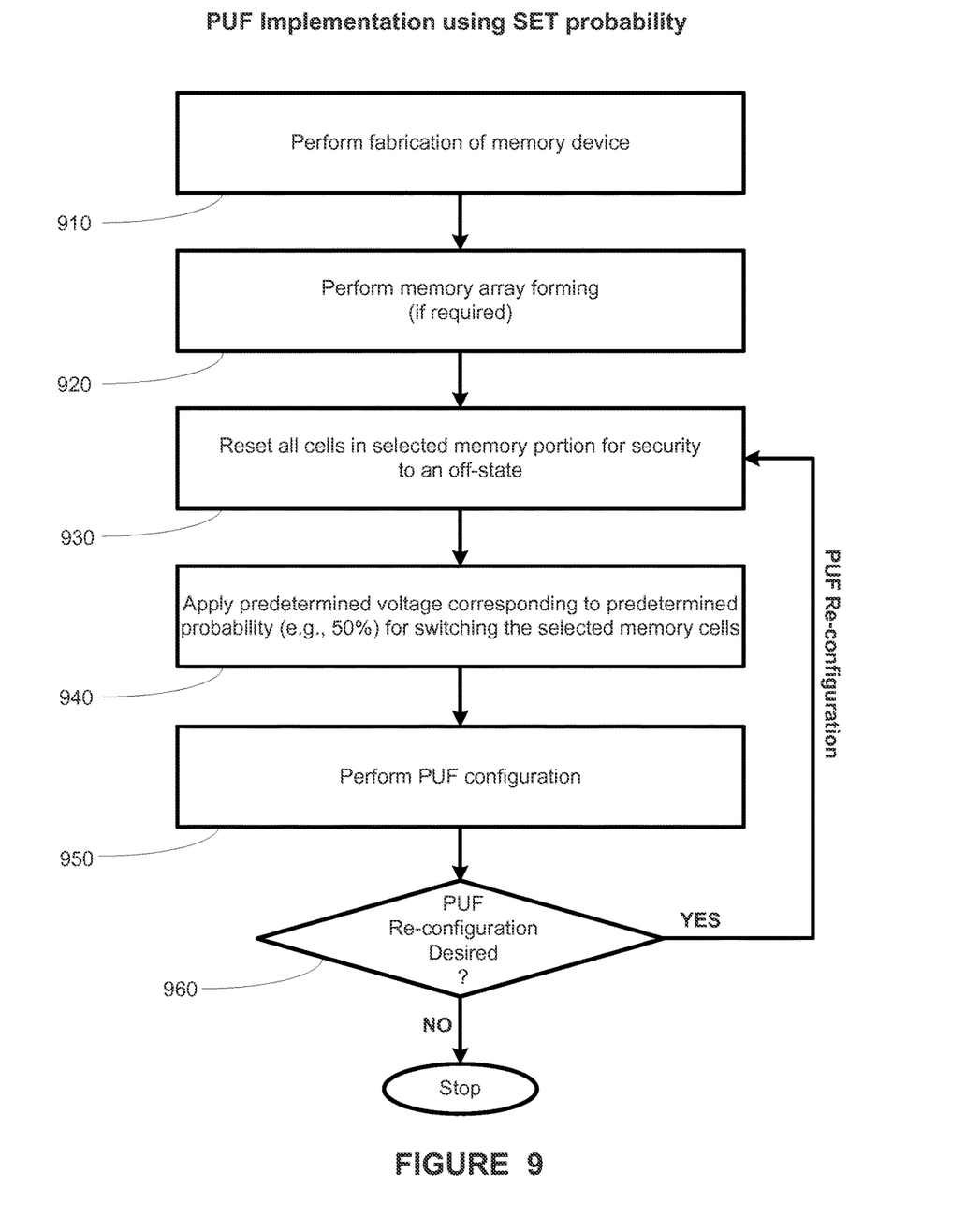
FIG. 9 illustrates a flowchart depiction of a PUF implementation using set probability, in accordance with embodiments herein.

Turning now to FIGS. 8 and 9, FIG. 8 illustrates a flowchart depiction of a PUF implementation using reset probability, in accordance with one embodiment, is illustrated; and FIG. 9 illustrates a flowchart depiction of a PUF implementation using set probability, in accordance with one embodiment. A non-volatile memory device array is fabricated by a semiconductor processing system (blocks 810, 910). In the case of RRAM memory devices, NVM memory array may be formed (blocks 820, 920). The forming process converts a memory device from its pristine state (typically with very high resistance) to a stable state with repeatable switching characteristics.

In the case of implementing a PUF using "reset" probability (FIG. 8), all the memory cells selected for the PUF implementation are set to an "on" state (block 830). In the case of implementing a PUF using "set" probability (FIG. 9), all the memory cells selected for the PUF implementation are reset to an off-state (block 930). Once the memory cells are set or reset, a predetermined voltage corresponding to a predetermined probability for switching the targeted memory cells is applied to the selected memory cells (block 840, 940). In one embodiment, a portion of the total memory cells in the memory device are selected for implementing PUF. In other embodiments, the entirety of memory cells in the memory device is selected for implementing PUF.

Once the selected memory cells are set or reset for PUF implementation, a PUF configuration process may be performed (blocks 850, 950). The PUF configuration process may comprise setting up a portion of the memory cells to return a predetermined state value (i.e., "0" or "1") in response to a challenge signal that comprises addresses of those selected memory cells. A more detailed description of the step of performing the PUF configuration process is provided in FIG. 10 and accompanying description below.

Once the PUF configuration process is performed, a determination may be made as to whether a PUF reconfiguration process is to be performed (block 860, 960). If a determination that a PUF reconfiguration is not required or desired, the process may stop. If a determination is made that a PUF reconfiguration is to be performed, the processes reverts back to blocks 830/930 to set/reset the memory cells and performing a PUF configuration (as indicated by the path from blocks 860/960 back to blocks 830/930.

Figure 10:
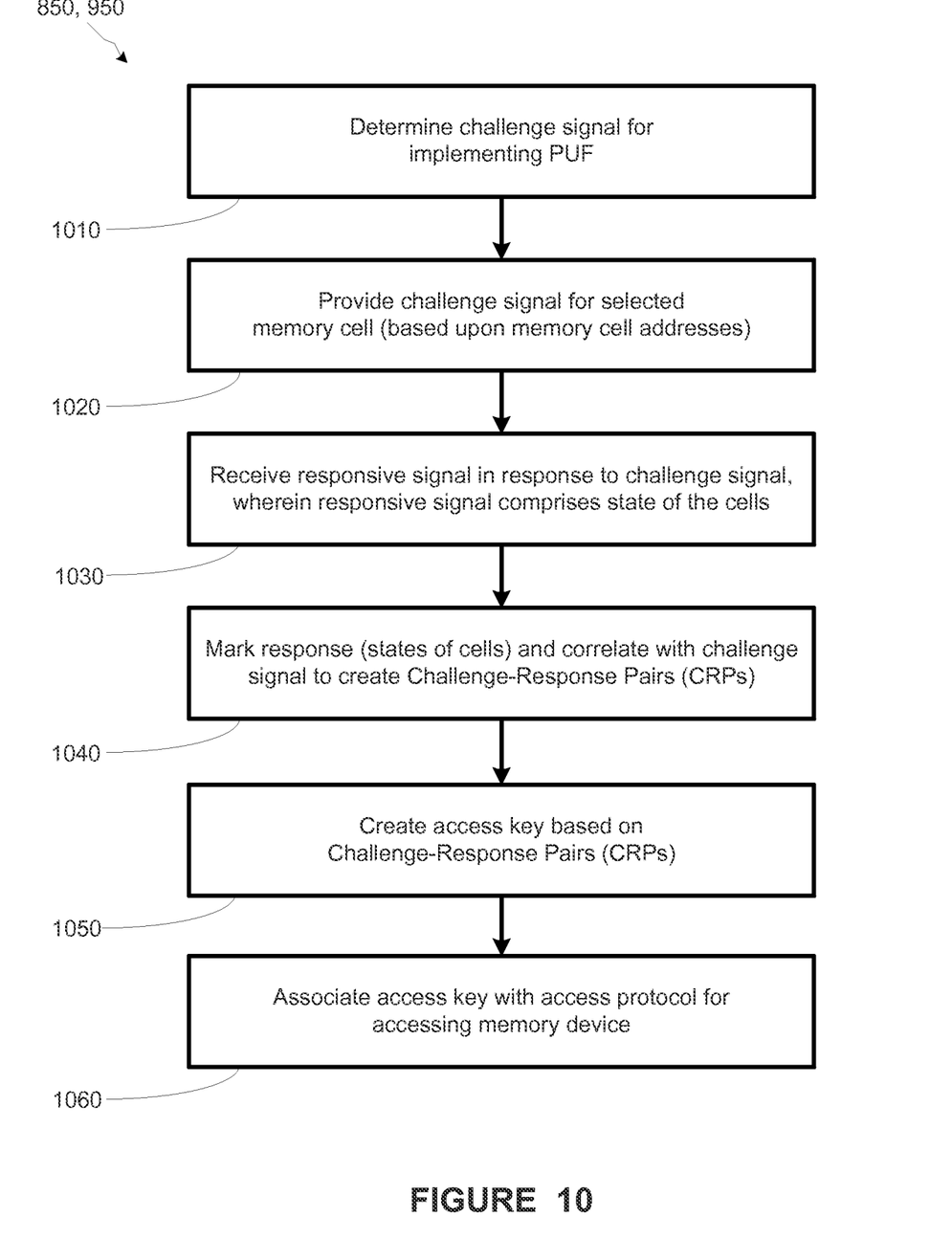
FIG. 10 illustrates a flowchart depiction of a method for performing the PUF configuration of FIG. 9, in accordance with embodiments herein.

Turning now to FIG. 10, a flowchart depiction of a method for performing the PUF configuration of FIG. 9, in accordance with embodiments herein is illustrated. A challenge signal may be created (block 1010). The challenge signal may comprise a set of addresses of memory components that were selected for the PUF implementation. In one embodiment, the set of addresses may comprise targeted memory addresses of memory locations that were selected for PUF implementation. In some embodiments, the set of addresses may comprise all of the memory cells in the memory device.

Based upon the challenge signal provided (block 1020) to the memory device, a response signal that is responsive to the challenge signal may be received (block 1030). The response signal may comprise the respective states of the addressed memory elements. The received states of the memory elements may be marked and/or a challenge-response pair (CRP) may be formed (block 1040). An access/authentication key may be formed based upon the CRP (block 1060). The key may be associated with access to the content of the memory device (block 1060). That is, access to the memory device is associated with the key, which is required for gaining access to content of the memory device. In one embodiment, the PUF implementation may be reconfigured to create a new access key for a memory device by repeating the steps from blocks 830 and 930 onwards. The CRP, PUF implementation, and the authentication/access key described herein may be implemented into various types of integrated circuit devices having a memory portion.

Figure 11:
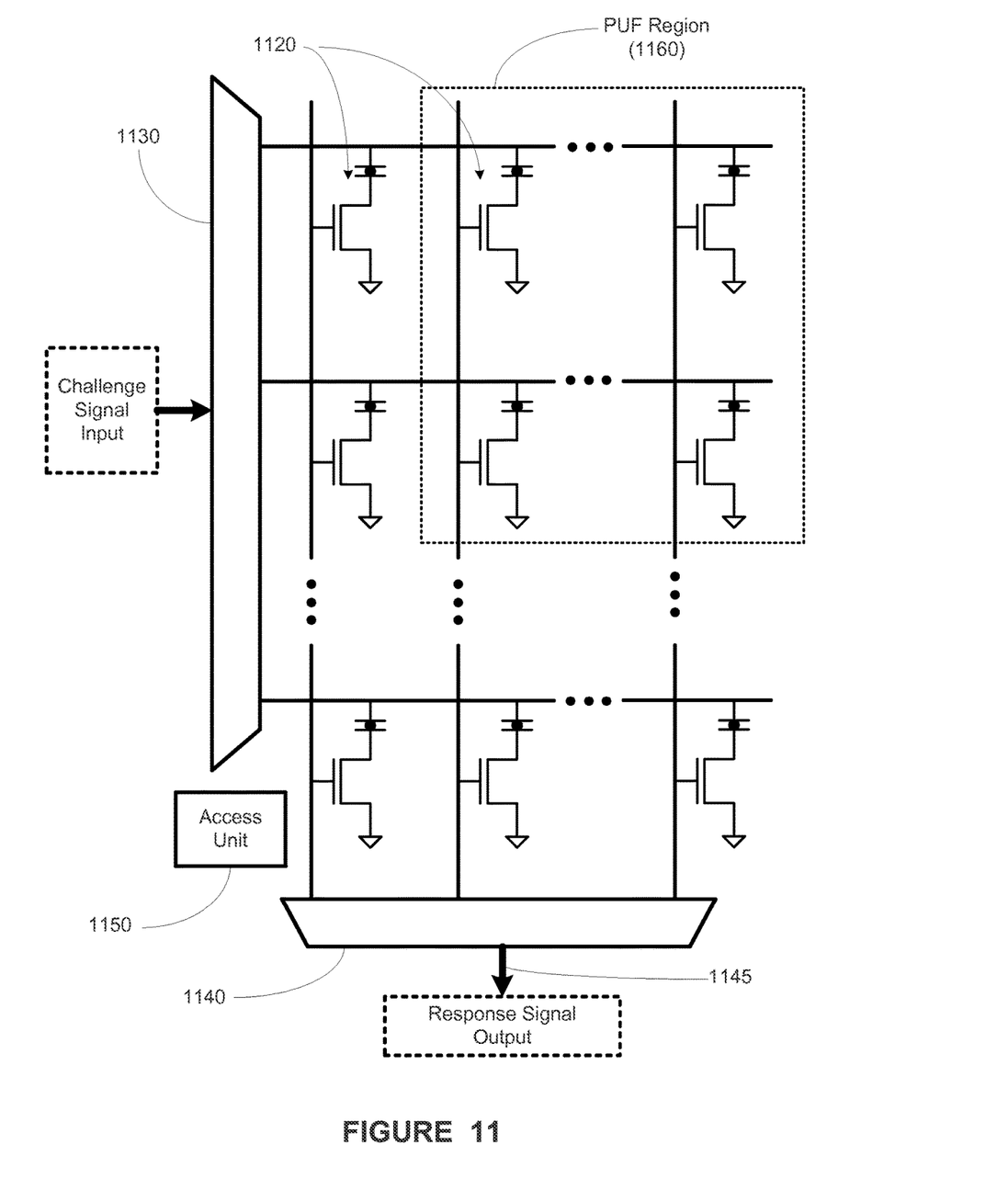
FIG. 11 illustrates a stylized depiction of an RRAM memory array for implementing a PUF, in accordance with embodiment herein.

Turning now to FIG. 11, a stylized depiction of an RRAM memory array for implementing a PUF, in accordance with embodiment herein, is illustrated. The RRAM may comprise a plurality of memory cells 1120. In one embodiment, the memory cells 1120 may be one transistor-one resistor (1T1R) memory cells. In one embodiment, the entirety of the memory cells 1120 in the memory device may be selected for PUF implementation. In an alternative embodiment, a portion of the memory cells 1120 is selected for PUF implementation, as indicated by the dotted lines 1160 in FIG. 11. The dotted lines 1060 indicate a PUF region, encompassing selected memory cells 1120 for PUF implementation.

A challenge signal may be provided to an input interface 1130 of the memory device. The input interface 1130 is capable of selecting addressed memory cells 1120 targeted for PUF implementation. Based upon the challenge signal, a response signal is provided via an output interface 1140. The signal from the output interface 1140 is a response signal providing the respective state indications of the addressed memory cells 1120. The output interface 1140 may provide output responsive signals on a multi-bit line 1145.

An access unit 1150 may determine whether the state outputs based upon the predetermined CRPs are confirmed based upon the received response signal. The access unit 1150 may be provided with the challenge signal information as well as the response signal information. Based upon the challenge signal and the response signal, the access unit 1150 may compare the state results from the response signal with the expected results based upon the particular applied challenge signal. The access unit 1150 may make a determination that the received response signal provides the state information that matches the expected states of the selected memory cells. Upon this determination, access to the memory device is authenticated and allowed. The access unit 1150 described herein may be implemented into various types of integrated circuit devices having a memory portion.

Figure 12:
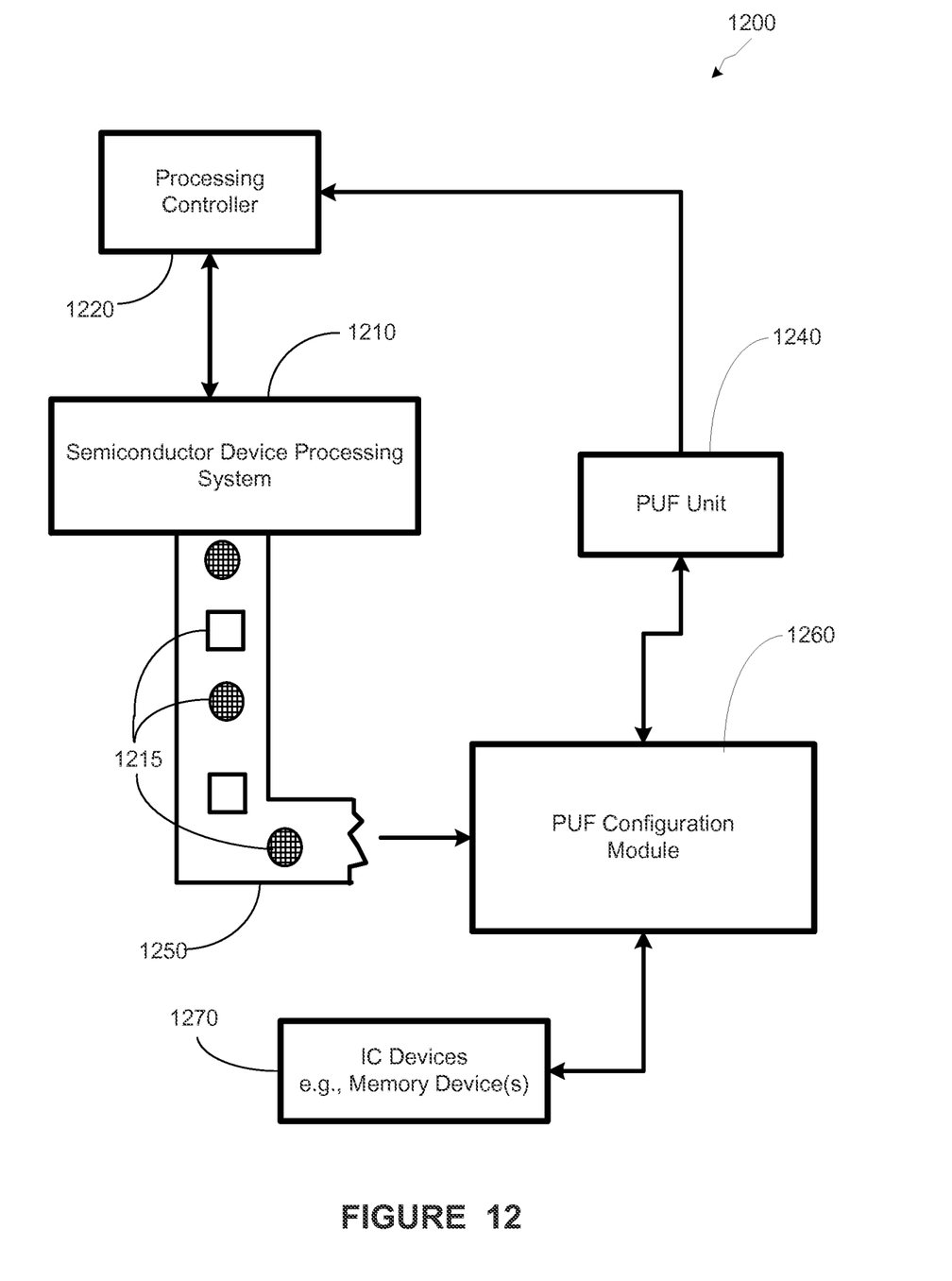
FIG. 12 illustrates a stylized depiction of a system capable of manufacturing memory devices, and is implementing PUFs, in accordance with embodiment herein.

Turning now to FIG. 12, a stylized block diagram depiction of a system in accordance with some embodiments herein, is illustrated. The system 1200 may comprise a semiconductor device processing system 1210. The semiconductor device processing system 1210 may comprise various processing stations, such as etch process stations, photolithography process stations, CMP process stations, etc. One or more of the processing steps performed by the processing system 1210 may be controlled by the processing controller 1220. The processing controller 1220 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 1210 may produce integrated circuits (e.g., memory devices) on a medium, such as silicon wafers. The processing system 1210 may provide processed integrated circuits/devices 1215 on a transport mechanism 1250, such as a conveyor system. In some embodiments, the conveyor system may be sophisticated clean room transport systems that are capable of transporting semiconductor wafers. In one embodiment, the semiconductor device processing system 1210 may comprise a plurality of processing sets, e.g., the $1^{st}$ process step, the $2^{nd}$ process set, etc., as described above.

In some embodiments, the items labeled "1215" may represent individual wafers, and in other embodiments, the items 1215 may represent a group of semiconductor wafers, e.g., a "lot" of semiconductor wafers. The integrated circuit or device 1215 may be a transistor, a capacitor, a resistor or a memory cell. In one embodiment, the device 1215 is a transistor and the dielectric layer is a gate insulation layer for the transistor.

The system may also comprise a PUF unit 1240. The PUF unit 1240 is capable of hard-coding an access/authentication key in various semiconductor devices 1215. The PUF unit 1240 is capable of providing data for implementing a PUF into manufactured memory device. The PUF unit 1240 is capable of generating a challenge signal, receive a response signal, and generate a plurality of CRPs. Various features of the manufactured memory devices may be affected by data from the PUF unit 1240. For example, certain memory cell regions may be set aside for performing the PUF. The access unit 1150 described above may be formed based upon data from the PUF unit 1240. The PUF unit 1240 described herein may be implemented in the manufacturing of various types of integrated circuit devices having a memory portion.

A PUF configuration module 1260 is capable of setting and/or re-setting memory elements in a memory device. Further, the PUF configuration module 1260 is capable of providing a challenge signal and receives a response signal. The PUF configuration module 1260 may determine CRP relationships to configure and/or re-configure a PUF implementation. Further, manufactured and packaged memory devices may be provided to the PUF configuration module 1260 to perform re-configuration of the PUF. The PUF configuration module 1260 described herein may be implemented in the manufacturing of various types of integrated circuit devices having a memory portion. In some embodiments, the PUF configuration module 1260 is capable of interfacing with manufactured IC devices 1270 comprising a memory portion for re-configuring the IC devices 1270 similar to the manner described above.

The system 1200 may be capable of performing analysis for various products involving various technologies. For example, the system 1200 may provide PUF implementation for CMOS technology, Flash technology, BiCMOS technology, power devices, memory devices (e.g., DRAM devices), NAND memory devices, and/or various other semiconductor technologies.

The system 1200 may be capable of manufacturing and testing various products that include transistors with active and inactive gates involving various technologies. For example, the system 1200 may provide for manufacturing and testing products relating to CMOS technology, Flash technology, BiCMOS technology, power devices, memory devices (e.g., DRAM devices), NAND memory devices, and/or various other semiconductor technologies.

The methods described above may be governed by instructions that are stored in a non-transitory computer readable storage medium and that are executed by, e.g., a processor in a computing device. Each of the operations described herein (e.g., FIGS. 5, 8-10) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   selecting a first memory portion of a memory device for providing an access confirmation;
   setting memory cells of said first memory portion to each store a same value, wherein said same value is "1" or "0";
   providing a first voltage for randomly switching the stored value of a portion of said memory cells, wherein providing said first voltage comprises at least one of: selecting a voltage value associated with a first switching probability for switching the stored value of said portion of said memory cells, said first switching probability being less than 20% or greater than 70% and corresponding to a first security level; or selecting a voltage value associated with a second switching probability for switching the stored value of said portion of said memory cells, said second switching probability being from 20% to 70% and corresponding to a second security level;
   providing a first input signal comprising at least one address associated with said memory cells;
   receiving a first responsive signal in response to said first input signal, wherein said first responsive signal comprises data relating to the state of said memory cells; and
   providing an access key for said access confirmation based upon a relationship between said first input signal and said first responsive signals.

2. The method of claim 1, wherein providing an access confirmation comprises implementing a physical unclonable function (PUF) for accessing said memory device.

3. The method of claim 2, wherein:
   providing an input signal comprises providing a challenge signal for prompting a response for said PUF; and
   receiving said responsive signal comprises receiving said responsive signal that is responsive to said challenge signal.

4. The method of claim 3, wherein providing an access key comprises determining a challenge-response pair based upon said challenge signal and said responsive signal.

5. The method of claim 1, wherein providing said access confirmation comprises:
   providing a second input signal, said second input signal being a challenge signal for a physical unclonable function (PUF) implementation;
   receiving a second responsive signal, wherein said second responsive signal is responsive to said second input signal and said second responsive signal comprises data relating to the state of said memory cells of said first selected portion; and
   determining whether data provided by said second responsive signal matches said access key.

6. The method of claim 5, further comprising providing access to said memory device in response to a determination that said second responsive signal matches said access key.

7. A non-transitory computer readable program storage unit encoded with instructions that, when executed by a computer, perform a method comprising:
   receiving a signal to configure a security access protocol for a memory device;
   setting at least a portion of memory cells of said memory device to each store a same value, wherein said same value is "1" or "0", in response to said signal to configure;
   providing a voltage having a first magnitude for randomly switching the stored value of a portion of said memory cells, wherein providing said voltage comprises at least one of: selecting a voltage value associated with a first switching probability for switching the stored value of said portion of said memory cells, said first switching probability being less than 20% or greater than 70% and corresponding to a first security level; or selecting a voltage value associated with a second switching probability for switching the stored value of said portion of said memory cells, said second switching probability being from 20% to 70% and corresponding to a second security level;
   providing a first address signal for addressing said memory cells;
   receiving a first response signal in response to said first address signal, wherein said response signal comprises the respective states of said memory cells; and
   correlating said first address signal and said first response signal for generating an access key for said security access protocol.

8. The non-transitory computer readable program storage unit of claim 7, further comprising associating said access key with said memory device for providing restricted access to said memory device.

9. The non-transitory computer readable program storage unit of claim 8, wherein providing restricted access to said memory device comprises:
   providing a second address signal, said second address signal is a challenge signal for a physical unclonable function (PUF) implementation;
   receiving a second response signal, wherein said second response signal is responsive to said second address signal and said second response signal comprises data relating to the state of said at least portion of said memory cells;
   determining whether data provided by said second response signal matches said access key; and
   providing access to said memory device in response to a determination that said second response signal matches said access key.

10. The non-transitory computer readable program storage unit of claim 7, wherein receiving said signal to configure a security access protocol for a memory device comprises receiving a signal to implement a physical unclonable function (PUF) for restricting accessing said memory device.

11. The non-transitory computer readable program storage unit of claim 10, wherein receiving a signal to implement said PUF comprises receiving a signal to reconfigure said PUF for changing said access key said PUF.

12. The non-transitory computer readable program storage unit of claim 10, wherein providing said first address signal comprises providing a challenge signal for said PUF.

13. The non-transitory computer readable program storage unit of claim 11, wherein correlating said first address signal and said response signal comprises generating a challenge-response pair (CRP) for said PUF.

14. The non-transitory computer readable program storage unit of claim 13, further comprising providing access to said memory device in response to a determination a signal received by said memory device matches said CRP.

15. An apparatus, comprising:
(i) an interface for receiving a signal to configure a restricted access protocol for an integrated circuit device;
(ii) a processor operatively coupled to said interface, wherein said processor is adapted to:
   set at least a portion of memory cells of a memory portion of said integrated circuit to each store a same value, wherein said same value is "1" or "0", in response to said signal to configure;
   apply a voltage having a first magnitude for randomly switching the stored value of a portion of said memory cells, wherein applying said voltage comprises at least one of: selecting a voltage value associated with a first switching probability for switching the stored value of said portion of said memory cells, said first switching probability being less than 20% or greater than 70% and corresponding to a first security level; or selecting a voltage value associated with a second switching probability for switching the stored value of said portion of said memory cells, said second switching probability being from 20% to 70% and corresponding to a second security level;
   provide an address signal for addressing said memory cells;
   receive a response signal in response to said address signal, wherein said response signal comprises the respective states of said memory cells; and
   correlate said address signal and said response signal for generating an access key for said restricted access protocol;
and
(iii) a memory controller adapted to provide access to said integrated circuit device based on said access key.

16. The apparatus of claims 15, wherein said memory controller is further capable of associating said access key with said memory device for providing restricted access to said memory device.

17. The apparatus of claim 16, wherein providing processor is further adapted to:
   provide a second address signal, said second address signal is a challenge signal for a physical unclonable function (PUF) implementation;
   receive a second response signal, wherein said second response signal is responsive to said second address signal and said second response signal comprises data relating to the state of said at least portion of said memory cells;
   determine whether data provided by said second response signal matches said access key; and
   provide access to said memory device in response to a determination that said second response signal matches said access key.

18. The apparatus of claim 15, wherein said signal to configure is a signal to implement a physical unclonable function (PUF) for restricting accessing said memory device.

19. The apparatus of claim 15, wherein said processor is further capable of reconfiguring said PUF changing said access key.

* * * * *